United States Patent [19]

Harrigan

[11] 3,954,007
[45] May 4, 1976

[54] WIND CHILL INSTRUMENT
[76] Inventor: Roy M. Harrigan, Bromley Mountain Road, Manchester, Vt. 05254
[22] Filed: May 2, 1975
[21] Appl. No.: 573,857

[52] U.S. Cl. ............................ 73/170 R; 73/339 C; 73/362.5
[51] Int. Cl.² ......................................... G01W 1/17
[58] Field of Search .............. 73/170 R, 339 C, 344, 73/362.4–362.8, 363.1

[56] References Cited
UNITED STATES PATENTS

| | | | |
|---|---|---|---|
| 2,154,927 | 4/1939 | Yaglou | 73/339 C X |
| 2,216,690 | 10/1940 | Madden | 73/363.1 X |
| 2,587,946 | 3/1952 | Wood | 73/170 R |
| 2,685,795 | 8/1954 | Hardy et al. | 73/170 R |
| 3,124,957 | 3/1964 | Bungo | 73/362.4 |
| 3,381,530 | 5/1968 | Lamb | 73/198 |
| 3,531,991 | 10/1970 | Strong et al. | 73/355 R |

Primary Examiner—Richard C. Queisser
Assistant Examiner—Frederick Shoon
Attorney, Agent, or Firm—Willis E. Higgins

[57] ABSTRACT

An instrument for indicating wind chill temperature has a temperature responsive means producing an indication of temperature and a wind velocity responsive means. Means operatively couples the wind velocity responsive means and the temperature responsive means for altering the indication of temperature produced by the temperature responsive means in accordance with wind velocity. The invention may utilize, e.g., a thermistor, a liquid column thermometer, or a bimetallic element as the temperature responsive means. The indication of temperature may be modified to give the wind chill temperature by a piezoelectric element, a heat transfer surface receiving a predetermined quantity of heat, or a member applying wind force to modify force produced by the bimetallic element, respectively.

5 Claims, 3 Drawing Figures

WIND CHILL INSTRUMENT

FIELD OF THE INVENTION

This invention relates to a new type of weather instrument. More particularly, it relates to a weather instrument capable of indicating a temperature corresponding to the combined effect of a given ambient temperature and a wind velocity on the human body, otherwise known as the wind chill temperature.

DESCRIPTION OF THE PRIOR ART

The chilling effect on the human body of the wind at low temperatures is well known. For a number of years, weather reports during the winter months have routinely included a wind chill temperature, derived from ambient temperature and wind velocity. Charts correlating such wind chill temperatures to ambient temperatures and wind velocities are available, so that a wind chill temperature can be obtained from such a chart by knowing the ambient temperature and wind velocity. The purpose of this wind chill temperature is to give a better indication of what precautions need be taken for winter weather conditions than obtained from ambient temperature alone or simply knowing ambient temperature and wind velocity. The concept of wind chill temperature has proved to be extremely useful for this purpose.

However, since individuals normally do not wish to go to the trouble of calculating or looking up a wind chill temperature even if they have instruments for measuring temperature and wind velocity, wind chill temperatures are normally obtained from the broadcast media or newspapers. Since weather conditions are subject to localized and rapid variation, there is a need in many situations to be able to monitor wind chill temperature on a continuous and localized basis.

SUMMARY OF THE INVENTION

Accordingly, it is an object of this invention to provide an instrument for measuring and indicating a temperature corresponding to the combined effect of a given ambient temperature and wind velocity on the body, otherwise known as the wind chill temperature.

It is another object of the invention to provide an instrument of simple construction which gives a direct indication of wind chill temperature.

It is a further object of the invention to provide means for monitoring wind chill temperature without requiring the user to carry out calculations or consult a chart to determine the wind chill temperature.

The attainment of these and related objects may be achieved through use of the novel instrument herein disclosed. A wind chill instrument in accordance with this invention has a temperature responsive means producing an indication of temperature and a wind velocity responsive means. Means operatively couples the wind velocity responsive means and the temperature responsive means for altering an indication of temperature of the temperature responsive means based on wind velocity. In a solid state embodiment, the temperature responsive means is a thermistor or other electric thermometer which produces an output signal dependent on temperature. The wind velocity responsive means is desirably a piezoelectric element or other pressure responsive transducer producing an output signal varying in relation to force applied to it. The wind is utilized to apply a force to the piezoelectric or other pressure responsive element. Suitable circuitry alters the indication of temperature produced by the thermistor and is connected to receive an output signal from the piezoelectric element for this purpose. In another form, a liquid column thermometer indicates temperature. A heat transfer surface is coupled to the thermometer. A predetermined amount of heat is supplied to the heat transfer surface, and as temperature scale of the thermometer indicates actual ambient temperature when the heat is supplied to the thermometer by the heat transfer surface and there is no wind. The wind removes heat from the heat transfer surface, thus lowering the temperature shown by the temperature scale of the thermometer to indicate the wind chill temperature. In another form, a bimetallic element produces a force which varies in relation to temperature. A member having a surface positioned to be impacted by the wind produces another force, which is used to modify the force produced by the bimetallic element, with the combined effect of the two forces being utilized to indicate the wind chill temperaure.

The attainment of the foregoing and related objects, advantages and features of the invention should be more apparent after review of the following detailed description of the invention, taken in conjunction with the drawings, in which:

An understanding of how wind chill instruments in accordance with this invention operate will be facilitated by first considering the wind chill chart shown below.

| Wind Speed MPH | | | | | | | | | | | | | | TEMPERATURE (°F) | | | | | | | |
|---|---|---|---|---|---|---|---|---|---|---|---|---|---|---|---|---|---|---|---|---|---|
| Calm | 40 | 35 | 30 | 25 | 20 | 15 | 10 | 5 | 0 | −5 | −10 | −15 | −20 | −25 | −30 | −35 | −40 | −45 | −50 | −55 | −60 |
| | | | | | | | | | WIND CHILL TEMPERATURE | | | | | | | | | | | | |
| 5 | 35 | 30 | 25 | 20 | 15 | 10 | 5 | 0 | −5 | −10 | −15 | −20 | −25 | −30 | −35 | −40 | −45 | −50 | −55 | −65 | −70 |
| 10 | 30 | 20 | 15 | 10 | 5 | 0 | −10 | −15 | −20 | −25 | −35 | −40 | −45 | −50 | −60 | −65 | −70 | −75 | −80 | −90 | −95 |
| 15 | 25 | 15 | 10 | 0 | −5 | −10 | −20 | −25 | −30 | −40 | −45 | −50 | −60 | −65 | −70 | −80 | −85 | −90 | −100 | −105 | −110 |
| 20 | 20 | 10 | 5 | 0 | −10 | −15 | −25 | −30 | −35 | −45 | −50 | −60 | −65 | −75 | −80 | −85 | −95 | −100 | −110 | −115 | −120 |
| 25 | 15 | 10 | 0 | −5 | −15 | −20 | −30 | −35 | −45 | −50 | −60 | −65 | −75 | −80 | −90 | −95 | −105 | −110 | −120 | −125 | −135 |
| 30 | 10 | 5 | 0 | −10 | −20 | −25 | −30 | −40 | −50 | −55 | −65 | −70 | −80 | −85 | −95 | −100 | −110 | −115 | −125 | −130 | −140 |
| 35 | 10 | 5 | −5 | −10 | −20 | −30 | −35 | −40 | −50 | −60 | −65 | −75 | −80 | −90 | −100 | −105 | −115 | −120 | −130 | −135 | −145 |
| 40 | 10 | 0 | −5 | −15 | −20 | −30 | −35 | −45 | −55 | −60 | −70 | −75 | −85 | −95 | −100 | −100 | −115 | −125 | −130 | −140 | −150 |

The top line of the chart shows actual ambient temperature, or the temperature that would be measured by a wind chill instrument in accordance with this invention with no wind blowing. The remaining lines of the chart show the wind chill temperature at the corresponding actual temperature with increasing wind speed to 40 miles per hour. Winds greater than 40 miles per hour have little additional effect, probably due to creation of a boundary layer around a person or instrument exposed to the wind. Also, the amount of heat loss from a person's body is limited by the heat conductivity of the body, and a similar effect applies to measuring devices. As shown in the chart, typically a 5 mph increase in wind speed will produce a drop of 5° F. in the wind chill temperature. As the wind speed approaches 40 mph, the drop in wind chill temperature becomes less for a corresponding increase in wind velocity. At lower temperatures, the drop in wind chill temperature tends to be greater for a corresponding increase in wind speed than at higher temperatures. The data in this chart comes from the U.S. Armed Services Arctic Aeromedical Laboratory. Any instrument for indicating the wind chill temperature directly must take the nonlinearities in wind chill temperature changes as a function of wind velocity into account to be accurate.

Figure 1:
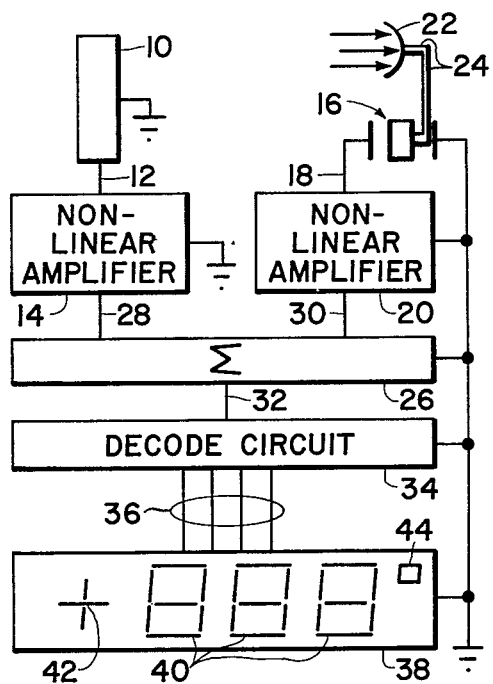
FIG. 1 is a schematic diagram of a wind chill instrument in accordance with the invention.

Turning now to the drawings, more particularly to FIG. 1, there is shown a solid state embodiment of a wind chill instrument in accordance with the invention. Thermistor 10 is connected by line 12 to nonlinear amplifier 14. Piezoelectric crystal 16 is connected by line 18 to nonlinear amplifier 20. Member 22, shown schematically as a conventional anemometer cup, is connected to piezoelectric crystal 16 by means of linkage 24. Nonlinear amplifiers 14 and 20 are connected to summary circuit 26 by lines 28 and 30. Output line 32 from summing circuit 26 is connected to decode circuit 34. Outputs 36 of decode circuit 34 are connected to display 38. Digits 40 of display 38 are formed by the conventional seven segments formed in a figure eight. Additional segments 42 and 44 in the display form a plus or minus sign and a degree symbol, respectively. Display 38 may be, e.g., a light emitting diode (LED) display or a liquid crystal display (LCD).

In operation, an output signal is supplied on line 12 from thermistor 10 to nonlinear amplifier 14, which output signal is proportional to ambient temperature sensed by the thermistor 10. Nonlinear amplifier 14 corrects for any nonlinearities over the operating range of thermistor 10, as well as accounting for the relationship that a greater wind chill effect is seen at lower temperatures than at higher temperatures. In a similar manner, nonlinear amplifier 20 corrects for any nonlinearities in the response of piezoelectric crystal 16 with applied wind pressure and accounts for the relationship that winds above 40 mph have little additional wind chill effect.

Since the above nonlinearities are accounted for by nonlinear amplifiers 14 and 20, the outputs on lines 28 and 30 need be simply combined in summing circuit 26 to produce a signal on output line 32 which is proportional to the wind chill temperature. Decode circuit 34 then converts this wind chill signal to appropriate signals on lines 36 for actuating display 38 to indicate the wind chill temperature corresponding to the signal on line 32.

If desired, a suitable switch means (not shown) may be provided so that the instrument may be used to indicate actual temperature by switching nonlinear amplifier 20 and piezoelectric crystal 16 out of the circuit or for indicating wind speed by switching nonlinear amplifier 14 and transducer 10 out of the circuit. Also, if desired, suitable circuitry (not shown) may be provided for using display 38 to indicate the time or other information when the instrument is not being used to indicate temperature, wind speed or wind chill temperature.

Figure 2:
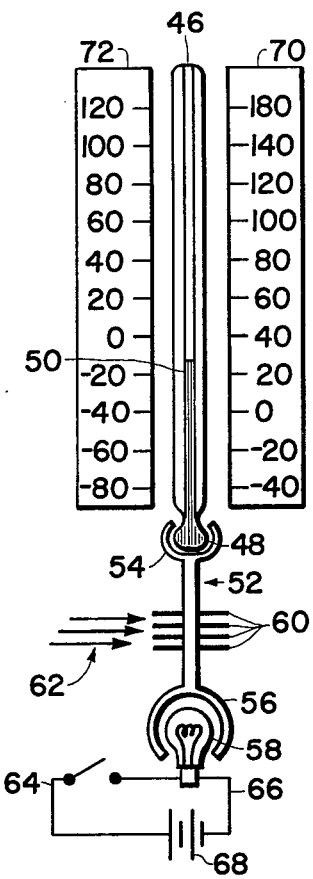
FIG. 2 is a plan view, in partial schematic form, of another embodiment of the invention.

FIG. 2 shows another embodiment of a windchill instrument in which a conventional mercury column thermometer 46 is employed. Mercury bulb 48 of the thermometer acts as a reservoir for the mercury column 50 in the conventional manner. A heat transfer member 52 has an end 54 enclosing the reservoir 48. Another end 56 of the heat transfer member 52 encloses a source of heat, such as incandescent bulb 58. Vanes 60 form a part of the heat transfer member 52 and are disposed to be impacted by wind 62. Lines 64 and 66 connect a source 68 of current to incandescent bulb 58. The instrument includes a first scale 70 which indicates the actual temperature when heat source bulb 58 is turned off. A second temperature scale 72 indicates the wind chill temperature when heat source bulb 58 is turned on and the unit is operating, or actual temperature when bulb 58 is on and there is no wind.

In operation, heat source bulb 58 provides a predetermined amount of heat to heat transfer member 52. Depending on the velocity of wind 62, which removes heat from the heat transfer member 52, especially through vanes 60, a greater or lesser amount of the heat generated by heat source bulb 58 is transmitted to reservoir 48 of thermometer 46. Heat source bulb 58 supplies a sufficient amount of heat to heat transfer member 52 such that wind chill temperature scale 72 will show the actual ambient temperature when no wind is blowing. Wind chill scale 72 is calibrated such that, as the wind velocity increases and more and more heat is thereby removed from heat transfer member 52 by it, the correspondingly lower temperature readings obtained on wind chill scale 72 represent the wind chill temperature. By providing a heat source and a heat transfer member connected between the heat source and a thermometer, the effect of wind 62 on the human body can be duplicated quite closely in order to provide wind chill temperature readings corresponding to those shown in the table presented above.

Figure 3:
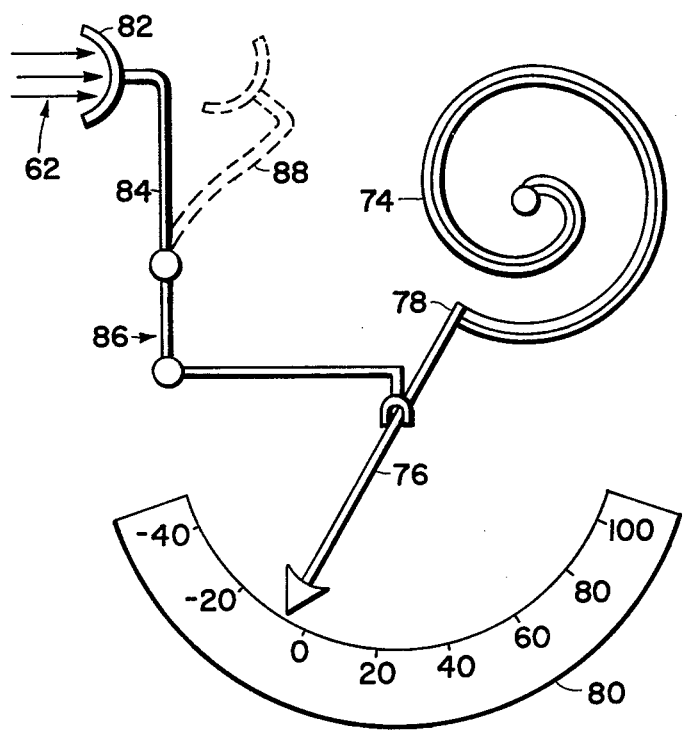
FIG. 3 is a plan view of a third embodiment of the invention.

FIG. 3 shows another embodiment of the invention, utilizing a conventional coiled bimetallic strip 74. A pointer 76 is connected to end 78 and arranged to move along temperature scale 80 as the bimetallic strip 74 expands or contracts with temperature changes. A conventional anemometer cup 82 is mounted on rod 84, which is connected by linkage 86 to pointer 76.

In operation, an increasing velocity of wind 62 causes the temperature reading indicated by arrow 76 on scale 80 to be depressed. Nonlinearities in the wind chill relationships, as shown in the table presented above, may be accounted for in the device. For example, one method of accounting for the fact that wind speeds in excess of 40 mph add little, if any, additional windchill effect is to make rod 84 out of a flexible material, so that it bends as shown by dotted line 88 with increasing wind velocity. If linkage 86 is disconnected, pointer 76 will indicate the true ambient temperature on scale 80.

It should now be apparent that novel wind chill instruments capable of achieving the stated objects of the invention have been provided. The instruments indicate the effect of wind velocity on the human body by providing a direct reading of the so-called wind chill temperature. The instruments compensate for the different wind chill effects of different wind velocities at different ambient temperatures. The instruments are also capable of indicating actual temperature or actual wind speed, if desired, as well.

While the invention has been described in detail with reference to preferred embodiments, it will be apparent to those skilled in the art that various changes in form and details may be made therein. It is intended that such modifications be covered within the spirit and scope of the claims appended hereto.

What is claimed is:
1. A wind chill instrument which comprises:
   a. temperature responsive means producing an indication of temperature;
   b. wind velocity responsive means, and
   c. means operatively coupling said wind velocity responsive means and said temperature responsive means for altering the indication of temperature of said temperature responsive means based on wind velocity.

2. The wind chill instrument of claim 1 in which said wind velocity responsive means alters the indication of temperature to a lesser extent for higher temperatures and for wind speeds in excess of about 40 miles per hour.

3. The wind chill instrument of claim 1 in which said temperature responsive means is a thermometer, said wind velocity responsive means comprises means for supplying a predetermined amount of heat to a heat transfer surface, and said means coupling said temperature responsive means and said wind velocity responsive means is a heat conductive member in contact with the thermometer and the heat transfer surface.

4. The wind chill instrument of claim 1 in which said temperature responsive means is a thermistor which produces an output signal dependent on temperature; said wind velocity responsive means comprises a piezoelectric element producing an output signal varying in relation to force applied to the piezoelectric element, and means for applying a force from wind to the piezoelectric element; and said means for altering the indication of temperature comprises circuit means, connected to receive the output signal from the piezoelectric element, for altering the output signal of said thermistor based on the output signal from the piezoelectric element.

5. The wind chill instrument of claim 1 in which said temperature responsive means comprises a bimetallic element producing a force in relation to temperature, said wind velocity responsive means comprises a member having a surface positioned to be impacted by wind, and said means coupling said temperature responsive means and said wind velocity responsive means comprises a flexible member which applies a force from the surface to modify the force produced by the bimetallic element.

* * * * *